UNITED STATES PATENT OFFICE.

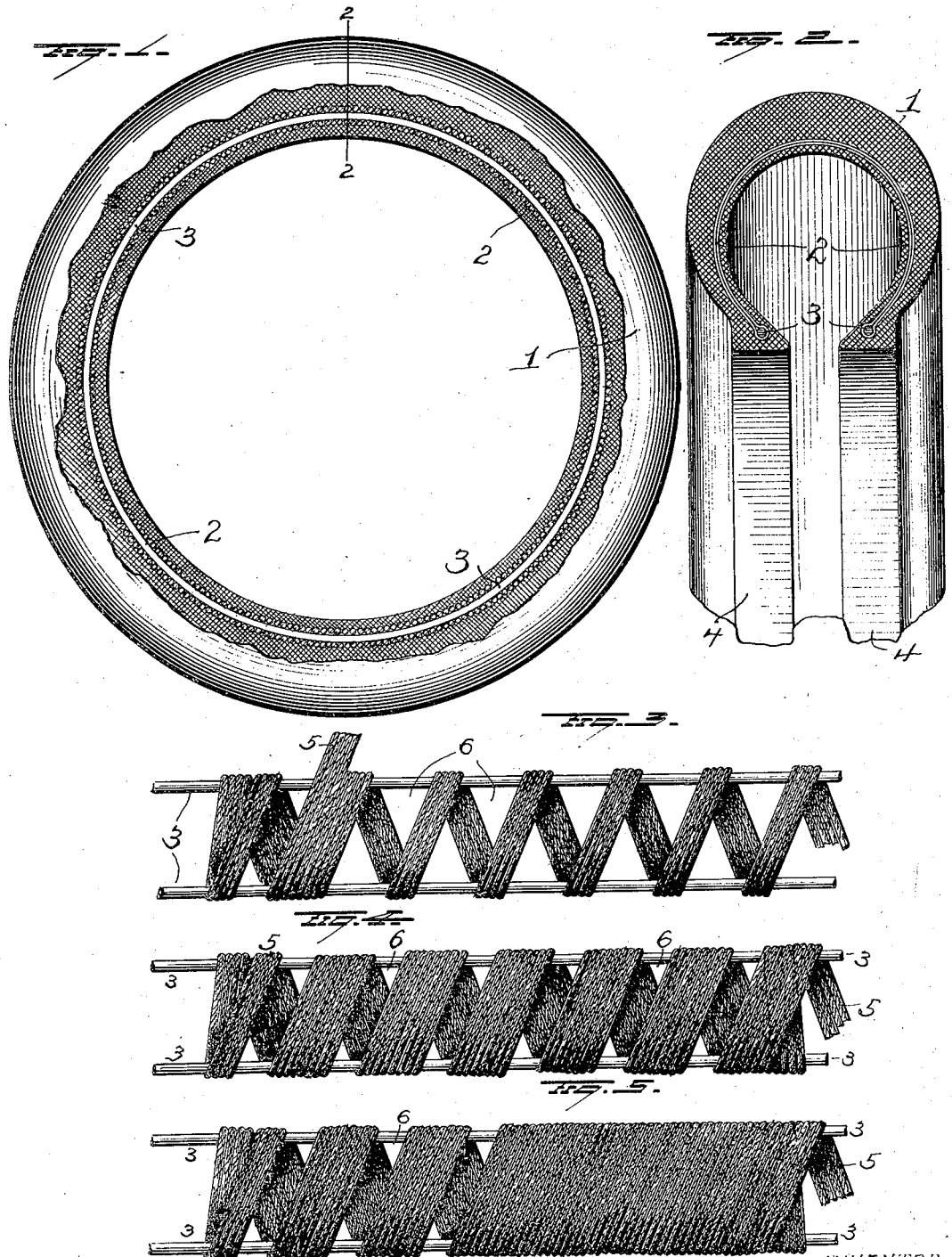

NEWTON BENJAMIN, OF ELMIRA, NEW YORK.

TIRE-CASING AND METHOD OF MAKING THE SAME.

1,351,463.  Specification of Letters Patent.  Patented Aug. 31, 1920.

Application filed January 26, 1918. Serial No. 213,895.

*To all whom it may concern:*

Be it known that I, NEWTON BENJAMIN, a citizen of the United States and a resident of Elmira, in the county of Chemung and State of New York, have invented certain new and useful Improvements in Tire-Casings and Methods of Making the Same; and I do hereby declare the following to be a full, clear, and exact description of the invention, such as will enable others skilled in the art to which it appertains to make and use the same.

This invention relates to improvements in tires such as employed on automobile wheels, and more particularly to an improved casing or armor for such tires,—the object of the invention being to so construct a tire armor or casing of the type embodying cord in their structure, that said armor or casing shall be effectually reinforced and capable of withstanding the lateral and other strains to which the same may be subjected.

A further object is to construct an armor or casing of the type specified, in such manner that the cord can be quickly and accurately applied and assembled in said armor or casing.

With these and other objects in view, the invention consists in certain novel features of construction and combinations of parts and in certain steps in the method of making the armor as hereinafter set forth and pointed out in the claims.

In the accompanying drawings; Figure 1 is a side view partly in section, of a tire armor or casing embodying my improvements; Fig. 2 is a transverse sectional view on line 2—2 of Fig. 1, and Figs. 3, 4 and 5 are views illustrating the manner of constructing the corded portion of the armor.

1 represents a tire armor or casing having its body portion constructed of yielding material, such as rubber or any suitable composition containing rubber, and embedded in the material of the body of said armor or casing, is my improved cord reinforcement, 2.

In constructing the said reinforcement, I employ two parallel wires or rods 3, 3 suitably spaced apart so that in the finished armor or casing said wires or rods shall occupy positions in the flanges 4 thereof.

A braid 5 comprising a plurality of strands of cord preferably impregnated with rubber, is first wound spirally on the wires 3, passing obliquely from one to the other, the winding being first so performed as to leave spaces 6 each of sufficient width to accommodate a plurality of added strands of the cord braid. After the braid shall have been wound on the wires or rods 3 from end to end thereof, said braid will be passed between said wires or rods and wound spirally thereon until the end at which the winding was first commenced shall have been reached,—the added strand of braid thus applied being caused to lie close against the previously wound braid in the spaces 6. The winding of the braid will then be reversed in the same manner as previously explained and the remaining portions of the spaces 6 closed. It is evident that instead of applying the braid in three strands or windings as above explained, the convolutions of the first winding might be disposed at a greater angle if desired, and a greater number of added windings applied. I have shown the braid as comprising four cords but it is evident that a greater or less number might be employed.

After the winding of the cord braid shall have been completed so that the same shall appear as shown at the right hand portion of Fig. 5, the reinforcement will be made to conform to the shape of the casing and will be embedded in the material thereof in any suitable manner so that the finished armor or casing shall appear as shown in Figs. 1 and 2.

Having fully described my invention what I claim as new and desire to secure by Letters Patent, is:—

1. A tire armor or casing having embodied therein, a reinforcement comprising parallel wires and a braid comprising a plurality of cords wound spirally on said wires in a plurality of strands of said braid alternately in reverse directions, the convolutions of each strand of braid lying alongside of the adjacent convolutions, and each convolution being disposed between two other convolutions.

2. The herein described method of making a tire armor or casing, consisting in spirally winding a braid comprising a plurality of cords on spaced wires so as to leave spaces between the convolutions, then spirally winding the cord braid alternately in opposite directions a plurality of times in the spaces between the convolutions of the first winding and embodying the reinforcement thus formed in the tire armor or casing.

In testimony whereof I have signed this specification in the presence of two subscribing witnesses.

NEWTON BENJAMIN.

Witnesses:
 GEORGE H. SPRING,
 CHARLES W. MOOERS.